…

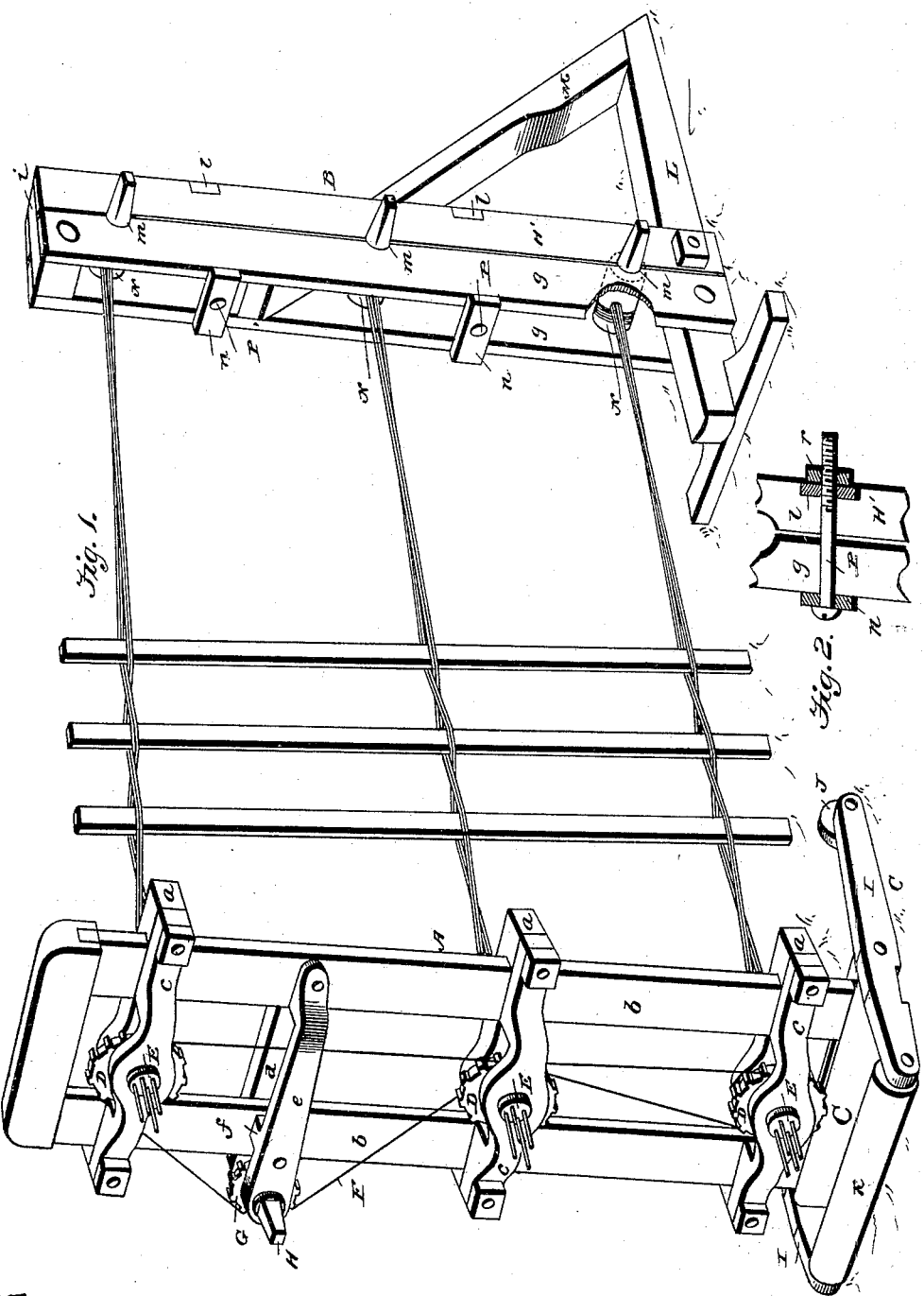

UNITED STATES PATENT OFFICE.

GEORGE J. CLINE, OF GOSHEN, INDIANA.

FENCE-MACHINE.

SPECIFICATION forming part of Letters Patent No. 398,377, dated February 26, 1889.

Application filed November 8, 1888. Serial No. 290,272. (Model.)

*To all whom it may concern:*

Be it known that I, GEORGE J. CLINE, a citizen of the United States, residing at Goshen, in the county of Elkhart and State of Indiana, have invented certain new and useful Improvements in Fence-Machines; and I do declare the following to be a full, clear, and exact description of the invention, such as will enable others skilled in the art to which it appertains to make and use the same.

This invention has relation in machines for wiring pales or pickets, such as used in the manufacture of picket fences; and the novelty will be fully understood from the following description and claims, when taken in connection with the accompanying drawings, in which—

Figure 1 is a perspective view of my improved machine, showing the same in an operative position with my improved tension device; and Fig. 2 is a detail sectional view.

Referring by letter to the said drawings, A indicates the twisting-machine, and B the tension-machine.

The twisting-machine A is composed of two upright bars firmly based in a parallel position and mounted upon a roller-frame, C, whereby the same may be transported or moved from place to place. Secured at suitable intervals to the front of the frame A in a transverse position are cross-bars *a*. These cross-bars have a projected center portion which assume a position between the uprights *b*, and it should be observed that the said cross-bars *a* are not secured directly to the said uprights, but to a cross-bar, *c*, on the opposite side thereof. The cross-bars *c* are recessed or depressed at a point corresponding with the extended portion of the cross-bars *a*, and both cross-bars are secured together at their opposite ends by means of bolts and nuts or other suitable fastening devices. The bars *a* are shouldered, so as to embrace the inner and outer vertical edges of the uprights *b*, so that they may be prevented from torsional strain. By having the offsets and recesses in one of the cross-bars and the projected portion of the other, it will be seen that the sprocket-wheels D of the twisting-heads E may be brought on the outer side of the upright frame A and provision made for the passage of the endless chain F.

G indicates a sprocket-wheel, which is journaled between the outer ends of two parallel bars, *d e*, and is adapted to receive an endless chain, F, and its spindle or shaft H is adapted to receive a hand-crank or other suitable means for rotating the same. The bar *e*, which assists in sustaining the shaft H of the sprocket-wheel G, is provided on its inner side with a lug, *f*, so as to set the same out sufficiently from the uprights *b* to form a passage for the endless chain. It will thus be seen that I provide a very cheap and durable frame for the twisting-machine.

The roller-frame C, upon which the twisting-machine is mounted, is composed of two lateral parallel bars, I, on the forward ends of which are journaled two small rollers, J, and on the opposite ends a large transverse roller, K.

The tension device consists of a base-piece, L, a strut, M, and two vertical parallel bars *g*, each rigidly secured to the strut and base-piece and each further secured to the top block, *i*. This forms the rigid part of the structure. I also employ two parallel bars, H', united by cross-bars *l* and pivoted to the base-piece by bolts and passing alongside of but not secured to the top block. These latter constitute a swinging frame, which is drawn toward the fixed frame by the bolts P and cross-bars *n* and *l* and a nut, *r*, so as to clamp the wire-holding spindles or spindles of the bobbins.

It should be here observed that the spindle of the wire-holders or tension-rollers N should be slightly greater in diameter than the bearings *m* of the bars *g* and H. Passing through the cross-strips *l* of the bars H' are the threaded bolts P, the forward ends of which may be headed and carry cross-strips *n*, which engage the forward edges of the vertical bars *g*, and these bolts have nuts *r* on their threaded ends, whereby the bars *g* and H' may be drawn toward each other or allowed to separate more or less, as desired. By this means it will be seen that when the rods have been drawn up, or the bars *g* and H' made to approach one another, the diameter of the roller-bearing will be lessened, and consequently the friction upon the shafts of the said rollers increased, thereby regulating the tension.

Having described my invention, what I claim is—

1. The combination, with a roller-frame, of the uprights $b$, secured thereto, the cross-bars $a$, having the central extended portion, the cross-bars $c$, having the central recess or depressed portion and secured together at their outer ends, the twisting-heads having sprocket-wheels and journaled between the two cross-bars on one side of the uprights, the sprocket-wheel G, journaled in the arms $d\ e$, and the arm $e$, having the lug $f$, so as to form a passage for the endless chain, substantially as specified.

2. In a tension device for use in fence-making, consisting of a base-piece, L, a strut, M, two parallel vertical bars, $g$, having matched notches in one edge and each rigidly secured to the base and strut, the block secured to the upper ends of said parallel bars, the two parallel bars H′, having notches corresponding with those of the bars $g$, united by cross-bars and pivoted at their lower ends to the base-piece and passing alongside but not secured to the top block, the cross-bars $n$, secured to the bars $g$, the cross-bars $l$, secured to the bars H′, the threaded rods passing through the respective cross-bars, and tightening-nuts on said rods, and wire holders or bobbins having their spindles in the notched bearings, substantially as specified.

In testimony whereof I affix my signature in presence of two witnesses.

GEORGE J. CLINE.

Witnesses:
LOU W. VAIL,
I. G. LEHMAN.